(12) United States Patent
Jang et al.

(10) Patent No.: US 7,616,277 B2
(45) Date of Patent: Nov. 10, 2009

(54) TRANSFLECTIVE LCD DEVICE HAVING DUAL THICKNESS COLOR FILTER

(75) Inventors: Sang-Min Jang, Gyeonggi (KR); See-Hwa Jeong, Gyeonggi (KR); Min-Joo Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 299 days.

(21) Appl. No.: 11/521,545

(22) Filed: Sep. 15, 2006

(65) Prior Publication Data
US 2007/0008469 A1 Jan. 11, 2007

Related U.S. Application Data

(62) Division of application No. 10/745,626, filed on Dec. 29, 2003, now Pat. No. 7,119,864.

(30) Foreign Application Priority Data
Dec. 31, 2002 (KR) .......................... 2002-0088486

(51) Int. Cl.
G02F 1/1335 (2006.01)
G02F 1/1337 (2006.01)
(52) U.S. Cl. .................. 349/114; 349/106; 349/129
(58) Field of Classification Search ................. 349/114, 349/129, 106
See application file for complete search history.

(56) References Cited

U.S. PATENT DOCUMENTS

| 6,104,460 | A | 8/2000 | Abe et al. |
|---|---|---|---|
| 6,522,377 | B2 | 2/2003 | Kim et al. |
| 6,741,308 | B2 | 5/2004 | Ha |
| 6,809,791 | B2 * | 10/2004 | Yi et al. ....................... 349/160 |
| 6,922,219 | B2 * | 7/2005 | Jin et al. ...................... 349/113 |
| 6,975,373 | B2 | 12/2005 | Il |
| 7,139,052 | B2 * | 11/2006 | Maeda ........................ 349/114 |
| 7,253,872 | B2 * | 8/2007 | Kume et al. ................... 349/191 |
| 2002/0003596 | A1 | 1/2002 | Kim |
| 2002/0101552 | A1 | 8/2002 | Yi et al. |

FOREIGN PATENT DOCUMENTS

KR 2002-0064470 8/2002

* cited by examiner

*Primary Examiner*—Julie Ngo
(74) *Attorney, Agent, or Firm*—Morgan Lewis & Bockius LLP

(57) ABSTRACT

A transflective LCD device includes first and second transparent substrates spaced apart from each other and having a reflective portion and a transmissive portion, an insulator on the first transparent substrate, a passivation layer on the insulator within the reflective portion, a reflector on the passivation layer, a transparent pixel electrode disposed over the insulator covering the reflector and the passivation layer, a buffer pattern disposed on a rear surface of the second substrate, the buffer pattern having a saw-tooth shape corresponding to the reflective portion, a color filter on the rear surface of the second substrate covering the buffer pattern, the color filter having a first thickness in the transmissive portion and a second thickness in the reflective portion, a transparent common electrode on a rear surface of the color filter, and a liquid crystal layer between the transparent pixel electrode and the transparent common electrode.

8 Claims, 11 Drawing Sheets

TRANSFLECTIVE LCD DEVICE HAVING DUAL THICKNESS COLOR FILTER

This application is a Divisional of U.S. patent application No. 10/745,626, file Dec. 29, 2003 now U.S. Pat. No. 7,119,864 and claims the benefit of Korean Patent Application No. 2002-0088486, filed in Korea on Dec. 31, 2002, which are both hereby incorporated by reference.

BACKGROUND OF THE INVENTION

1. Field of the Invention

The present invention relates to a liquid crystal display device and a method of fabricating a liquid crystal display device, and more particularly, to a transflective liquid crystal display device having a dual thickness color filter and a method of fabricating the same.

2. Description of Related Art

Presently, liquid crystal display (LCD) devices having light weight, thin profiles, and low power consumption characteristics are commonly used in office automation equipment and video units. The LCD devices typically use a liquid crystal (LC) interposed between upper and lower substrates, and make use of optical anisotropy of the LC. Since molecules of the LC are thin and long, an alignment direction of the LC molecules can be controlled by application of an electric field to the LC molecules. When the alignment direction of the LC molecules is properly adjusted, the LC can be aligned such that light is refracted along the alignment direction of the LC molecules to display images.

In general, LCD devices are divided into transmissive-type LCD devices and reflective-type LCD devices according to whether the display device uses an internal or external light source. The transmissive-type LCD device includes an LCD panel and a backlight device, wherein the incident light produced by the backlight device is attenuated during transmission so that the actual transmittance is only about 7%. In addition, the transmissive-type LCD device requires a relatively high initial brightness, whereby electrical power consumption by the backlight device increases. Accordingly, a relatively heavy battery, which cannot be used for an extended period of time, is needed to supply sufficient power to the backlight device.

In order to overcome these problems, the reflective-type LCD has been developed. Since the reflective-type LCD device uses ambient light instead of the backlight device, wherein a reflective opaque material is used as a pixel electrode, the reflection-type LCD device is light and easy to carry. In addition, since the power consumption of the reflective-type LCD device is reduced, it can be used as a personal digital assistant (PDA). However, the reflective-type LCD device is easily affected by its surroundings. For example, since ambient light in an office differs largely from that of the outdoors, the reflective-type LCD device can not be used where the ambient light is weak or does not exist. In order to overcome the problems described above, a transflective-type LCD device has been developed, wherein a user's may select from the transmissive mode to the reflective mode, or vise versa.

Figure 1:
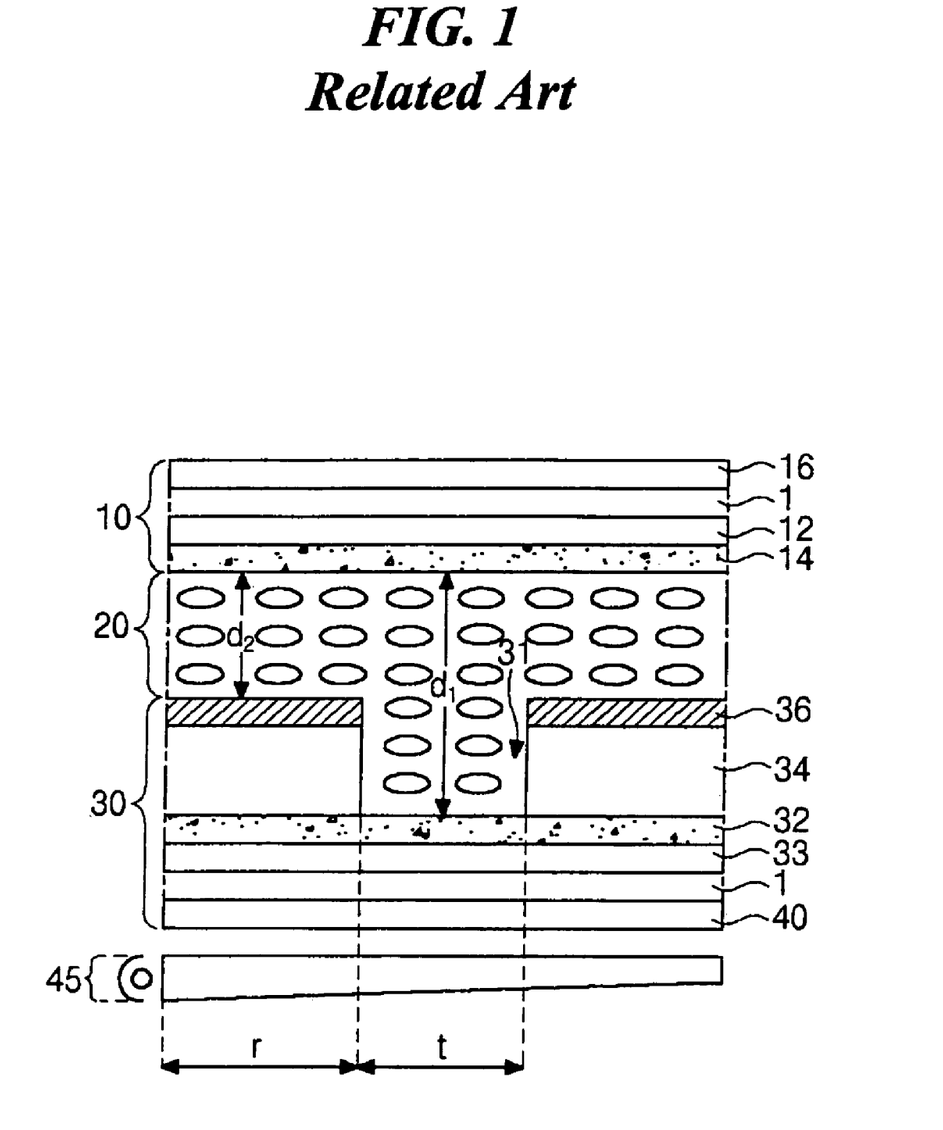
FIG. 1 is a schematic cross sectional view of a transflective-type LCD device according to the related art.

FIG. 1 is a schematic cross sectional view of a transflective-type LCD device according to the related art. In FIG. 1, a transflective-type LCD device includes an upper substrate 10, a lower substrate 30, an interposed liquid crystal layer 20 therebetween, and a backlight device 45 disposed below the lower substrate 30, wherein each of the upper and lower substrates 10 and 30 has a transparent substrate 1. The upper substrate 10 includes a color filter 12 formed on a rear surface of the transparent substrate 1, and an upper transparent electrode 14 formed on the color filter 12, wherein the upper transparent electrode 14 serves as a common electrode. In addition, an upper polarizer 16 is formed on a front surface of the transparent substrate 1, wherein the upper polarizer 16 serves as a filter for selectively transmitting portions of incident light produced by the backlight device 45. Accordingly, the upper polarizer 16 has an optical polarizing axis along one direction such that only the portions of incident light having the same vibrating direction as the direction of the polarizing axis can pass through the upper polarizer 16.

In FIG. 1, the lower substrate 30 includes an insulating layer 33 formed on the front surface of the transparent substrate 1, and a lower transparent electrode 32 formed on the insulating layer 33. In addition, a passivation layer 34 and a reflective electrode 36 are formed in series on the lower transparent electrode 32, and a transmitting hole 31 is formed in the passivation layer 34 and the reflective electrode 36 to expose a portion of the pixel electrode 32. Furthermore, a lower polarizer 40 is formed on the lower surface of the transparent substrate 1 in the lower substrate 30. Thus, when an electric field is applied across the liquid crystal layer 20, molecules of the liquid crystal layer 20 align in accordance with the electric field such that the liquid crystal layer 20 refracts the incident light in order to display an image.

In FIG. 1, an area corresponding to the reflective plate 36 is a reflective portion "r" and an area corresponding to the portion of the pixel electrode 32 exposed by the transmissive hole 31 is a transmissive portion "t". In addition, a first cell gap "$d_1$" at the transmissive portion "t" is about twice that of a second cell gap "$d_2$" at the reflective portion "r," thereby reducing a light path difference. A retardation "$\delta$" of the liquid crystal layer 20 is defined as a product of refractive index anisotropy "$\Delta n$" with a cell gap "d" (i.e., $\delta = \Delta n \cdot d$), wherein a light efficiency of the LCD device is proportional to the retardation "$\delta$." Accordingly, in order to reduce the difference of light efficiencies between the reflective and transmissive modes, the retardations of the liquid crystal layer 20 at two portions should be nearly equal to each other by making the first cell gap "$d_1$" of the transmissive portion "t" larger than that of the reflective portion "r."

However, although the light efficiencies of the liquid crystal layer 20 between the reflective and transmissive modes become equal by making the cell gaps different, the light passing through the color filters at different locations is different, wherein the brightness can be different at the front of the display device. The transmittance of the color filter resin whose absorption coefficient is high for a specific wavelength and low for other wavelengths has the following relationship considering only the absorption, i.e., the transmittance is inversely proportional to the absorption coefficient and the distance that light passes:

$$T = \exp(-\alpha(\lambda)d)$$

where T is transmittance of the light, $\alpha(\lambda)$ is an absorption coefficient depending on the wavelength of the light, and d is a distance that the light passes.

Since the color filter resin is a viscous material, the thickness of the color filter resin is hard to control and can not be fabricated at less than a specific thickness. Therefore, the color filter layers of the reflective and transmissive portions have the same thickness and different absorption coefficients (i.e., different material) for the uniform transmittance. However, if the color filter layers of the reflective and transmissive portions are formed of different materials, the process time and production costs would increase, thereby decreasing yield of the display device.

To solve the above problems, a fabricating method of color filter layers using the same resin has been suggested. During the fabricating method, the color filter layers at the reflective and transmissive portions have the same absorption coefficient, but have different thicknesses so that the transmittance has the same value.

Figure 2A:
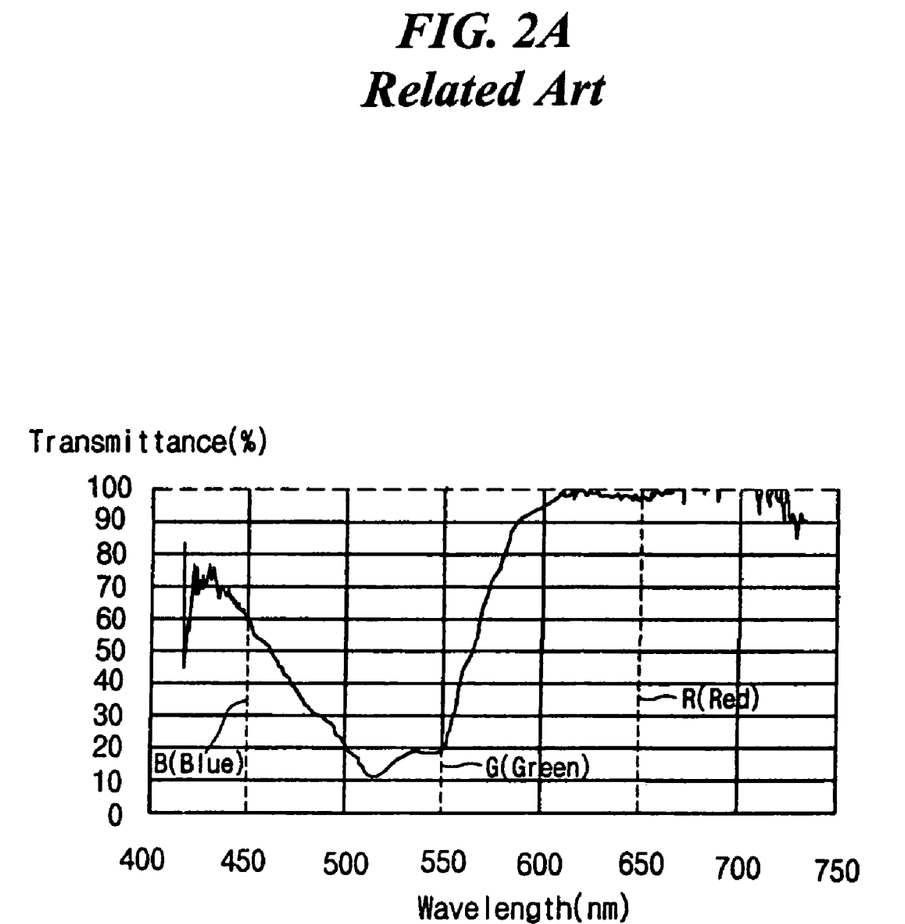
FIG. 2A is a transmittance spectrum measured during a reflective mode of a first red color filter layer having a certain thickness according to the related art.
Figure 2B:
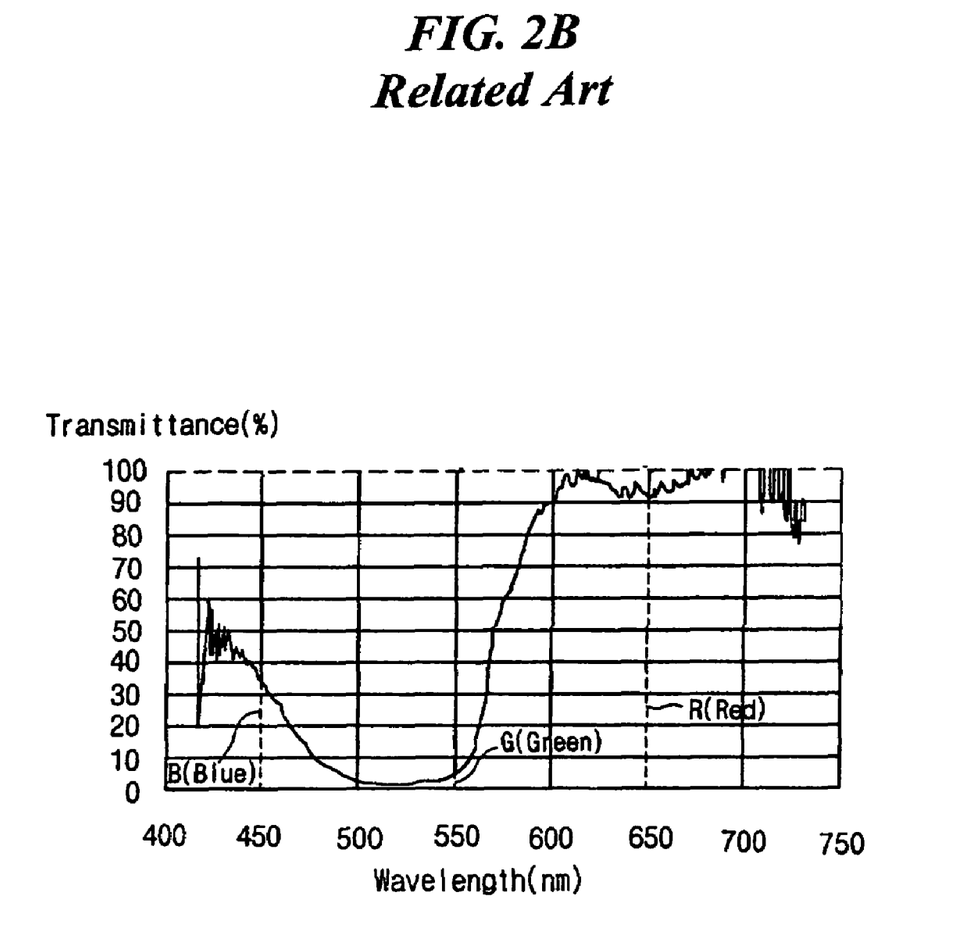
FIG. 2B is a transmittance spectrum measured during a reflective mode of a second red color filter layer having twice the certain thickness according to the related art.

FIG. 2A is a transmittance spectrum measured during a reflective mode of a first red color filter layer having a certain thickness according to the related art, and FIG. 2B is a transmittance spectrum measured during a reflective mode of a second red color filter layer having twice the certain thickness according to the related art. In general, visible light has a wavelength with a range of about 400 to about 700 nanometers, wherein red, green, and blue colors roughly correspond to wavelengths of 650, 550, and 450 nanometers, respectively.

In FIG. 2A, the transmittances at wavelengths corresponding to the red, green, and blue colored light are about 97%, 20% and 58%, respectively. Although the transmittance for the red colored light is high, the transmittances for the other colors are not negligible such that color purity is not obtained.

In FIG. 2B, since the second red color filter layer has twice the thickness and a square transmittance compared with the first red color filter layer of FIG. 2A, the transmittances at wavelengths corresponding to the red, green, and blue colored light are about 94%, 4% and 34%, respectively. Although the transmittance is decreased for all colors, the decreased amount is different for the individual colors, for example, about 5%, 16% and 24% for the red, green, and blue colored lights, respectively. Therefore, the color purity of the second red color filter layer is improved and results can be applied for the green and blue color filters so that the transmittance and color purity of the transflective-type LCD device using the same kind of color filter resin can be uniform for the reflective and transmissive portions. An example of a transflective-type LCD device having a dual thickness color filter (DCF) using the above-detailed principles may be found in Korean Patent Application No. 2000-9979.

Figure 3:
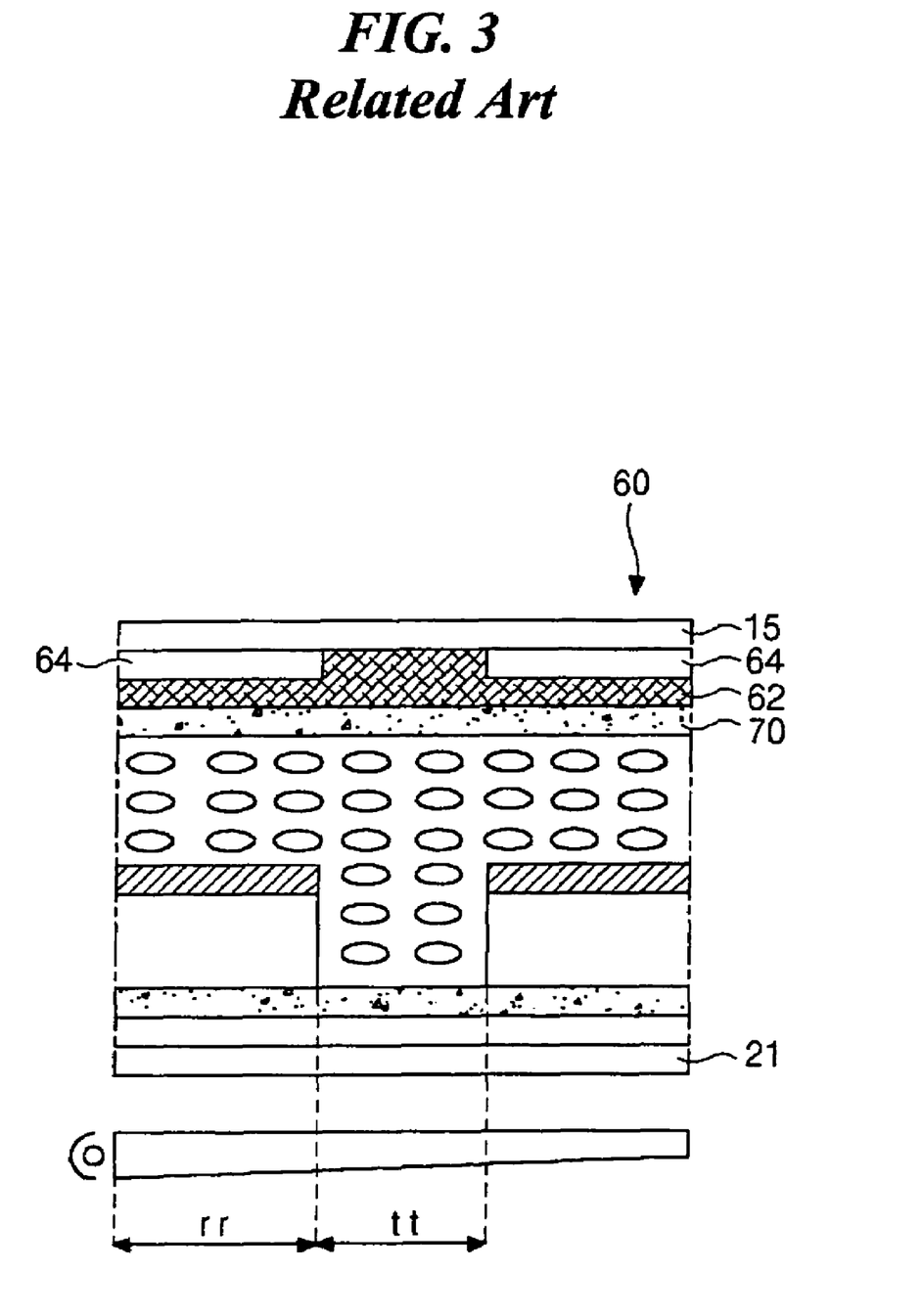
FIG. 3 is a cross sectional view of a transflective-type LCD device having a dual thickness color filter layer according to the related art.

FIG. 3 is a cross sectional view of a transflective-type LCD device having a dual thickness color filter layer according to the related art. In FIG. 3, a transparent buffer layer 64 is formed on an inner surface of an upper substrate 15 only at a reflective portion "rr," and a color filter layer 62 is formed along an entire upper substrate 15. Accordingly, a color filter layer 62 of a transmissive portion "tt" is thicker than that of the reflective portion "rr" so that the color purity of the transmissive portion "tt" can be improved. The transparent buffer layer 64 is formed by depositing and patterning one of an insulating material group comprising acrylic resin, benzocyclobutene (BCB), and silicon nitride (SiNx).

Figure 4A:
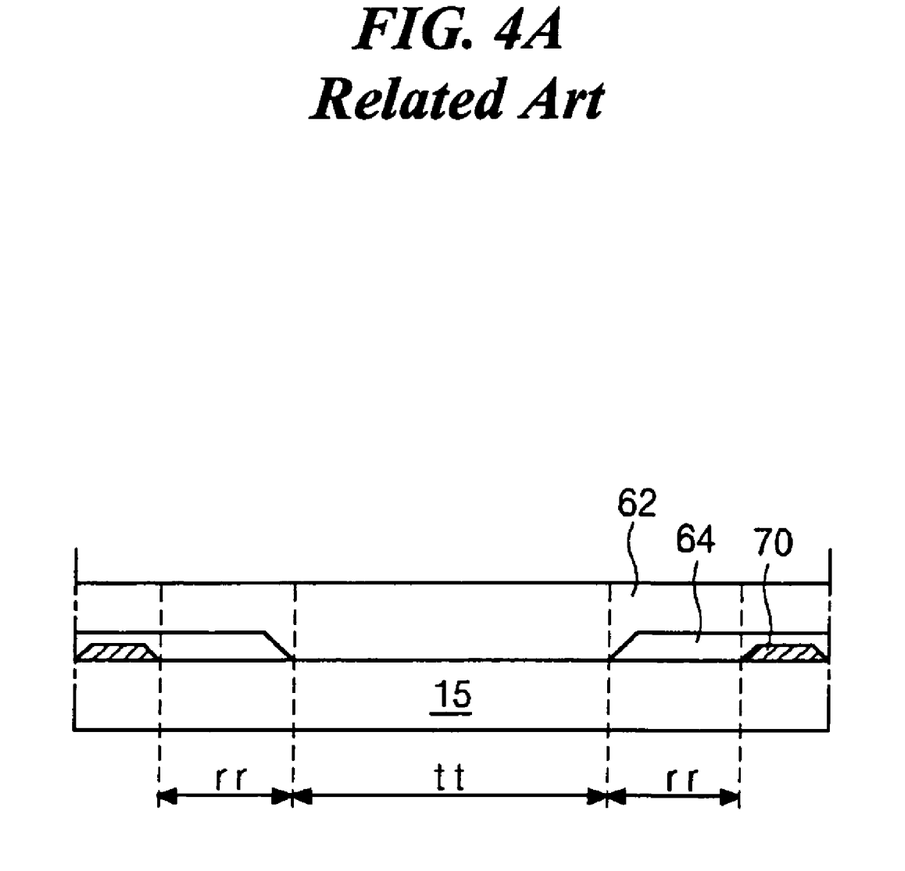
FIG. 4A is a cross sectional view of a dual thickness color filter substrate having a transparent buffer layer of a first thicknesses according to the related art.
Figure 4B:
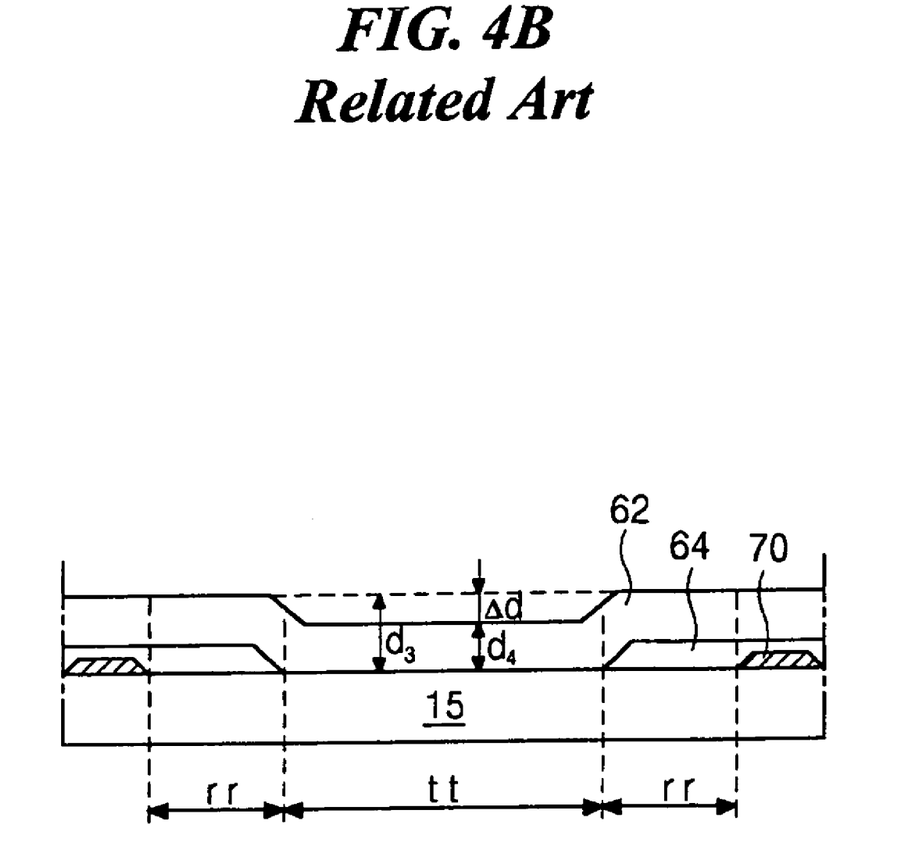
FIG. 4B is a cross-sectional view of a dual thickness color filter substrate having a transparent buffer layer of a second thickness according to the related art.

FIG. 4A is a cross sectional view of a dual thickness color filter substrate having a transparent buffer layer of a first thicknesses according to the related art, and FIG. 4B is a cross-sectional view of a dual thickness color filter substrate having a transparent buffer layer of a second thickness according to the related art. In FIG. 4A, a substrate 15 has a transmissive portion "tt" and a reflective portion "rr." In addition, a black matrix 70 and a transparent buffer layer 64 are formed in the reflective portion "rr," and a color filter layer 62 is formed along an entire surface of the substrate 15. Since the transparent buffer layer 64 of a first thickness has a low step at a borderline of the transmissive portion "tt" and the reflective portion "rr," a surface of the color filter layer 62 can be planarized. Moreover, since the color filter layer 62 at the transmissive portion "tt" is thicker than that at the reflective portion "rr", the color purity can be improved at the transmissive portion "tt". However, since the thickness of the transparent buffer layer 64 is limited for the planarization of the color filter layer 62, the thickness ratio of the color filter layer 62 is limited and improvement of the color purity is limited.

In FIG. 4B, in order to have a desired thickness ratio of the color filter layer 62, the transparent buffer layer 64 has a second thickness higher than the first thickness of FIG. 4A, and a high step at the borderline of the transmissive portion "tt" and the reflective portion "rr". Since the color filter layer 62 is made of a viscous resin and is formed according to a surface of an underlayer, the color filter layer 62 also has a step at a top surface. Therefore, the difference "Δd" between the designed thickness $d_3$ and the fabricated thickness $d_4$ occurs, and improvement of the color purity of the transmissive portion "tt" is limited.

Accordingly, it is very difficult to form the transparent buffer layer having a color filter thickness to be the desired thickness in the transmissive portion, whereby the color difference occurs between the transmissive portion and the reflective portion of the DCF structure. If the color filter in the transmissive portion does not have a desired thickness to obtain the desired color purity, color reproduction of the transmissive portion will not increase as much as that of the reflective portion.

Moreover, when the transparent buffer layer has the high step at the borderline of the transmissive portion and the reflective portion, the color filter thereon has an uneven surface so that planarization of the common electrode formed on the color filter is degraded. Specifically, the uneven surface of the color filter causes the common electrode to have a rough surface, thereby deteriorating image display quality of the LCD device.

SUMMARY OF THE INVENTION

Accordingly, the present invention is directed to a transflective liquid crystal display device and method of fabricating the same that substantially obviates one or more of the problems due to limitations and disadvantages of the related art.

An object of the present invention is to provide a color filter substrate of a transflective liquid crystal display device to produce uniform color purity and uniform color reproduction.

Another object of the present invention is to provide a method of fabricating a color filter substrate of a transflective liquid crystal display device to produce uniform color purity and uniform color reproduction.

Another object of the present invention is to provide a transflective liquid crystal display device having an easily controllable buffer layer pattern in order to control a color filter thickness in a transmissive portion to optimized image color.

Another object of the present invention is to provide a method of fabricating a transflective liquid crystal display device having an easily controllable buffer layer pattern in order to control a color filter thickness in a transmissive portion to optimized image color.

Another object of the present invention is to provide a transflective liquid crystal display device having high transmittance and color purity.

Another object of the present invention is to provide a method of fabricating a transflective liquid crystal display device having high transmittance and color purity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a transflective LCD device includes first and second transparent substrates spaced apart from each other and having a reflective portion and a transmissive portion, an insulator on the first transparent substrate, a passivation layer on the insulator within the reflective portion, a reflector on the passivation layer, a transparent pixel electrode disposed over the insulator covering the reflector and the passivation layer, a buffer pattern disposed on a rear surface of the second substrate, the buffer pattern having a saw-tooth shape corresponding to the reflective portion, a color filter on the rear surface of the second substrate covering the buffer pattern, the color filter having a first thickness in the transmissive portion and a second thickness in the reflective portion, a transparent common electrode on a rear surface of the color filter, and a liquid crystal layer between the transparent pixel electrode and the transparent common electrode.

In another aspect, a transflective LCD device includes first and second transparent substrates spaced apart from each other and having a reflective portion and a transmissive portion, an insulator on the first transparent substrate, a passivation layer on the insulator within the reflective portion, a reflector on the passivation layer, a transparent pixel electrode disposed over the insulator covering the reflector and the passivation layer, a buffer pattern disposed on a rear surface of the second substrate, the buffer pattern having a striped shape and a plurality of holes therein corresponding to the reflective portion, a color filter on the rear surface of the second substrate covering the buffer pattern, the color filter having a first thickness in the transmissive portion and a second thickness in the reflective portion, a transparent common electrode on a rear surface of the color filter, and a liquid crystal layer between the transparent pixel electrode and the transparent common electrode.

In another aspect, a method of fabricating a transflective LCD device includes providing first and second transparent substrates spaced apart from each other and having a reflective portion and a transmissive portion, forming an insulator on the first transparent substrate, forming a passivation layer on the insulator within the reflective portion, forming a reflector on the passivation layer, forming a transparent pixel electrode over the insulator to cover the reflector and the passivation layer, forming a buffer pattern on a rear surface of the second substrate, the buffer pattern having a saw-tooth shape corresponding to the reflective portion, forming a color filter on the rear surface of the second substrate to cover the buffer pattern, the color filter having a first thickness in the transmissive portion and a second thickness in the reflective portion, forming a transparent common electrode on a rear surface of the color filter, and forming a liquid crystal layer between the transparent pixel electrode and the transparent common electrode.

In another aspect, a method of fabricating a transflective LCD device includes providing first and second transparent substrates spaced apart from each other and having a reflective portion and a transmissive portion, forming an insulator on the first transparent substrate, forming a passivation layer on the insulator within the reflective portion, forming a reflector on the passivation layer, forming a transparent pixel electrode over the insulator to cover the reflector and the passivation layer, forming a buffer pattern on a rear surface of the second substrate, the buffer pattern having a striped shape and a plurality of holes therein corresponding to the reflective portion, forming a color filter on the rear surface of the second substrate to cover the buffer pattern, the color filter having a first thickness in the transmissive portion and a second thickness in the reflective portion, forming a transparent common electrode on a rear surface of the color filter, and forming a liquid crystal layer between the transparent pixel electrode and the transparent common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain principles of the invention. In the drawings.

DETAILED DESCRIPTION OF PREFERRED EMBODIMENTS

Reference will now be made in detail to the preferred embodiments of the present invention, example of which is illustrated in the accompanying drawings.

Figure 5:
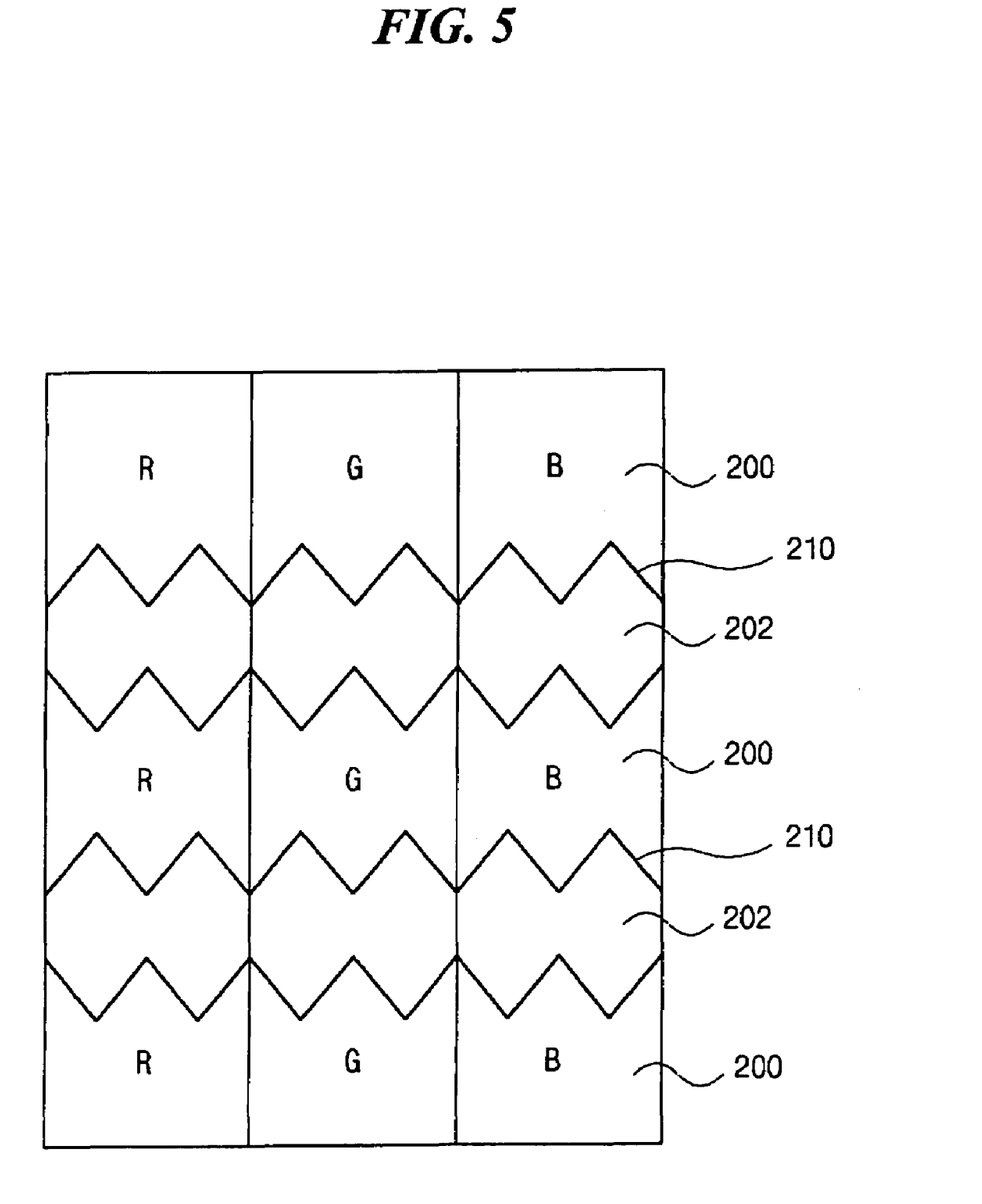
FIG. 5 is a schematic plan view of an exemplary color filter substrate having a shaped buffer layer pattern according to the present invention.

FIG. 5 is a schematic plan view of an exemplary color filter substrate having a shaped buffer layer pattern according to the present invention. In FIG. 5, transmissive regions 200 and reflective regions 202 may be alternately disposed along up-and-down directions in each of red (R), green (G), and blue (B) color regions. In addition, buffer patterns 210 may be disposed within the reflective regions 202, wherein each of the buffer patterns 210 may have a saw-tooth shape along sides of the buffer patterns 210. The saw-tooth shape may control flow of a viscous color photoresist when forming the R, G, and B color filters. Specifically, the saw-tooth shape may provide the color photoresist to be formed in the reflective regions 202 having a desired thickness, although the buffer patterns may have a high step.

Figure 6:
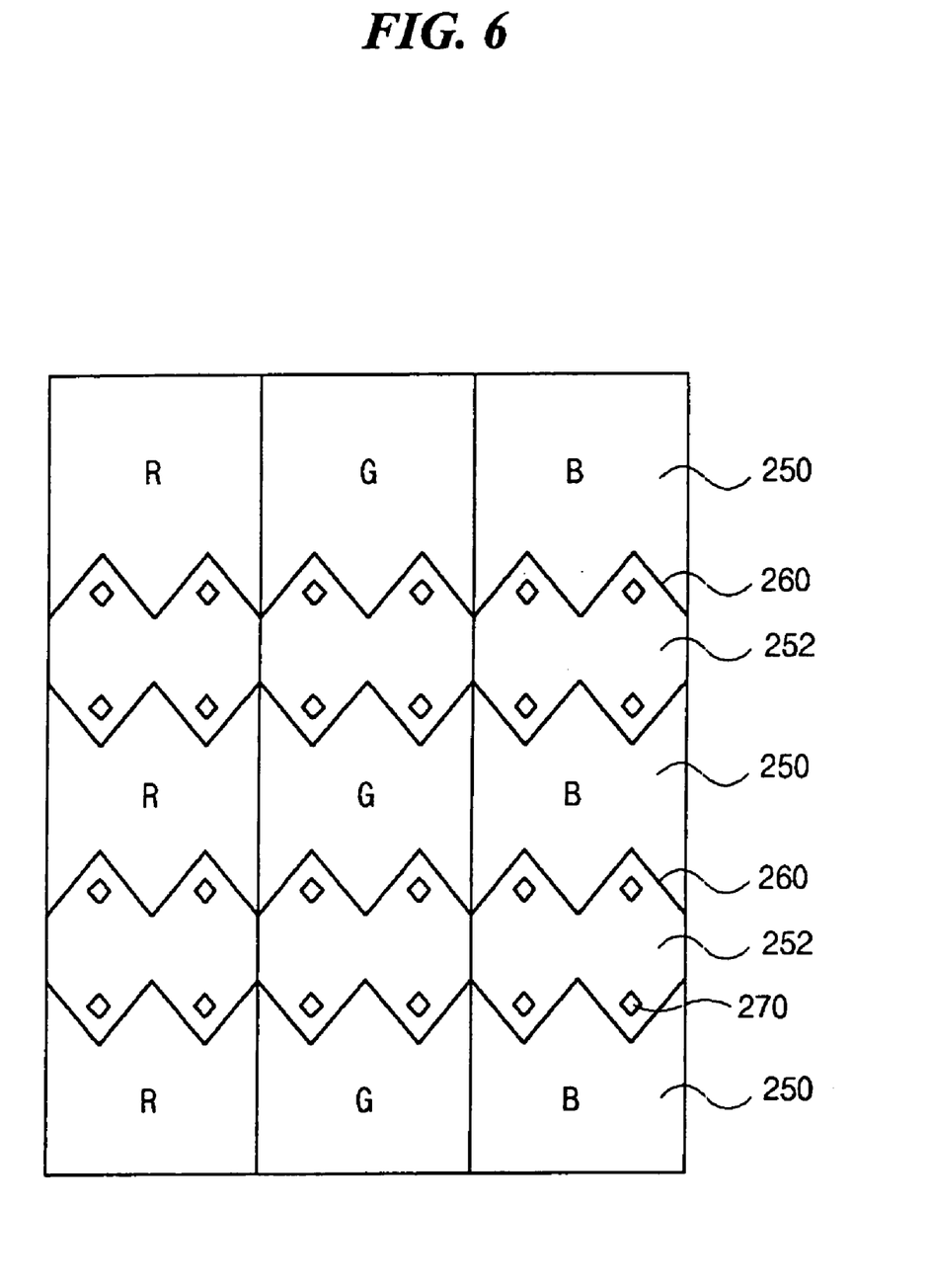
FIG. 6 is a schematic plan view of another exemplary color filter substrate having a shaped buffer layer pattern according to the present invention.

FIG. 6 is a schematic plan view of another exemplary color filter substrate having a shaped buffer layer pattern according to the present invention. In FIG. 6, transmissive regions 250 and reflective regions 252 may be alternately disposed along up-and down directions in each of red (R), green (G), and blue (B) color regions. In addition, buffer patterns 260 may include a saw-tooth shape. However, each of the buffer patterns 260 may include a plurality of holes 270 to capture viscous color photoresist when forming the R, G, and B color filters. For example, the holes 270 and the saw-tooth shape of the buffer pattern 260 may not allow the viscous color photoresist from flowing down from the buffer patterns 260, thereby controlling thicknesses of the R, G, and B color filters between the transmissive regions 250 and the reflective regions 252.

Figure 7:
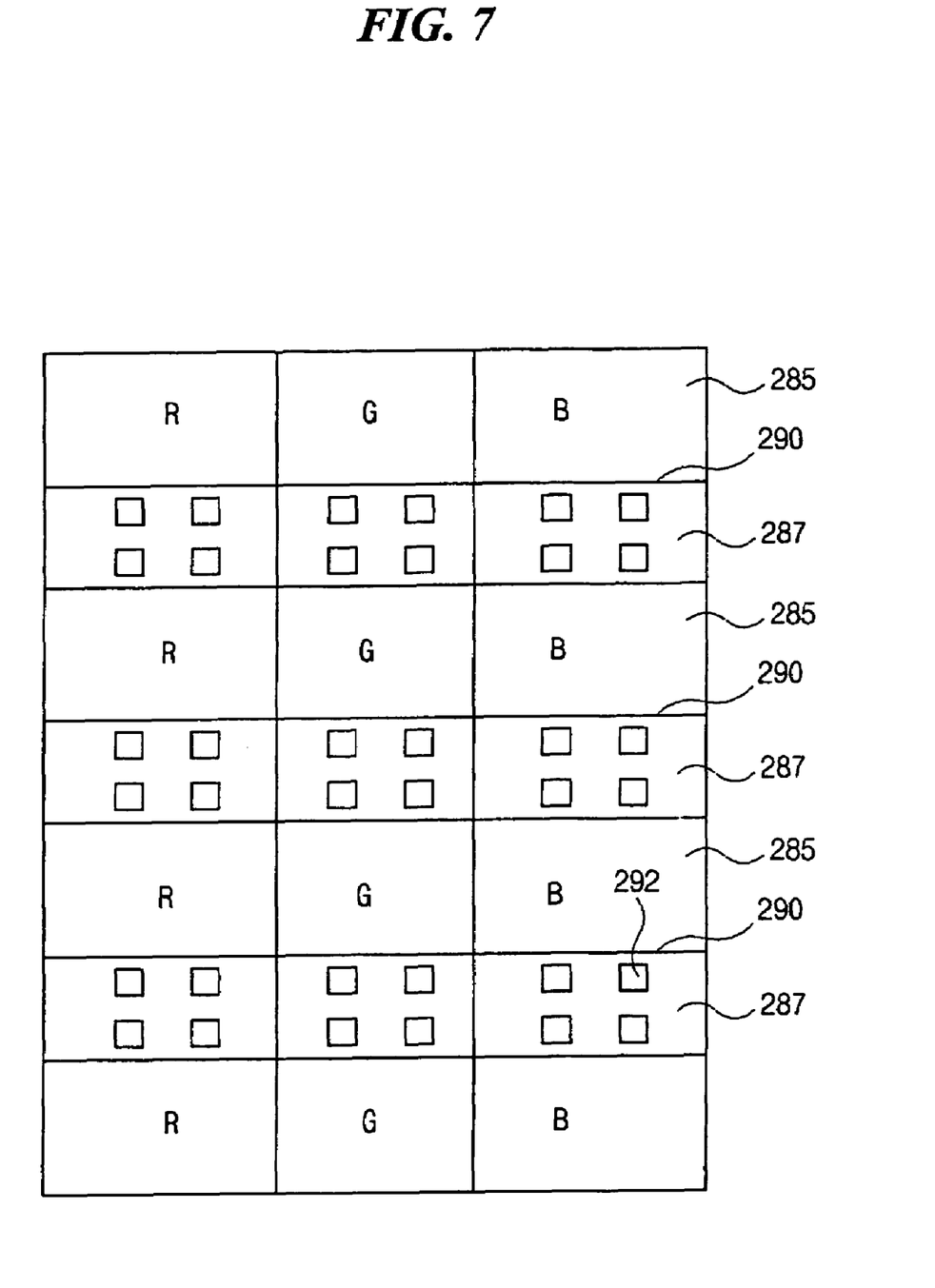
FIG. 7 is a schematic plan view of another color filter substrate having a shaped buffer layer pattern according to the present invention.

FIG. 7 is a schematic plan view of another color filter substrate having a shaped buffer layer pattern according to the present invention. In FIG. 7, a buffer pattern 290 located in a reflective region 287 may not have a saw-tooth shape, but only a plurality of holes 292 therein. As described with reference to FIG. 6, the plurality of holes 292 may capture viscous color photoresist and function to prevent the viscous color photoresist from flowing down from a top of the buffer pattern 287.

In FIGS. 5, 6, and 7, the buffer patterns 210, 260, and 290 may have a striped shape, and a maximum width of each of the buffer patterns 210, 260, and 290 may be about 14 micrometers. Accordingly, each of the buffer patterns 210, 260, and 290 may have a color filter thickness in the transmissive portion to be as large as that in the reflective portion. However, if the maximum width of the buffer pattern is larger than about 50 micrometers, it not be possible for the color filter in the transmissive portion to have a thickness of about 1.3 times larger than that in the reflective portion. Thus, the maximum width of each of the buffer patterns 210, 260, and 290 may be less than about 50 micrometers in order to obtain a desired color filter thickness in the transmissive portion to be at least about 1.3 times larger than that in the reflective portion.

Figure 8:
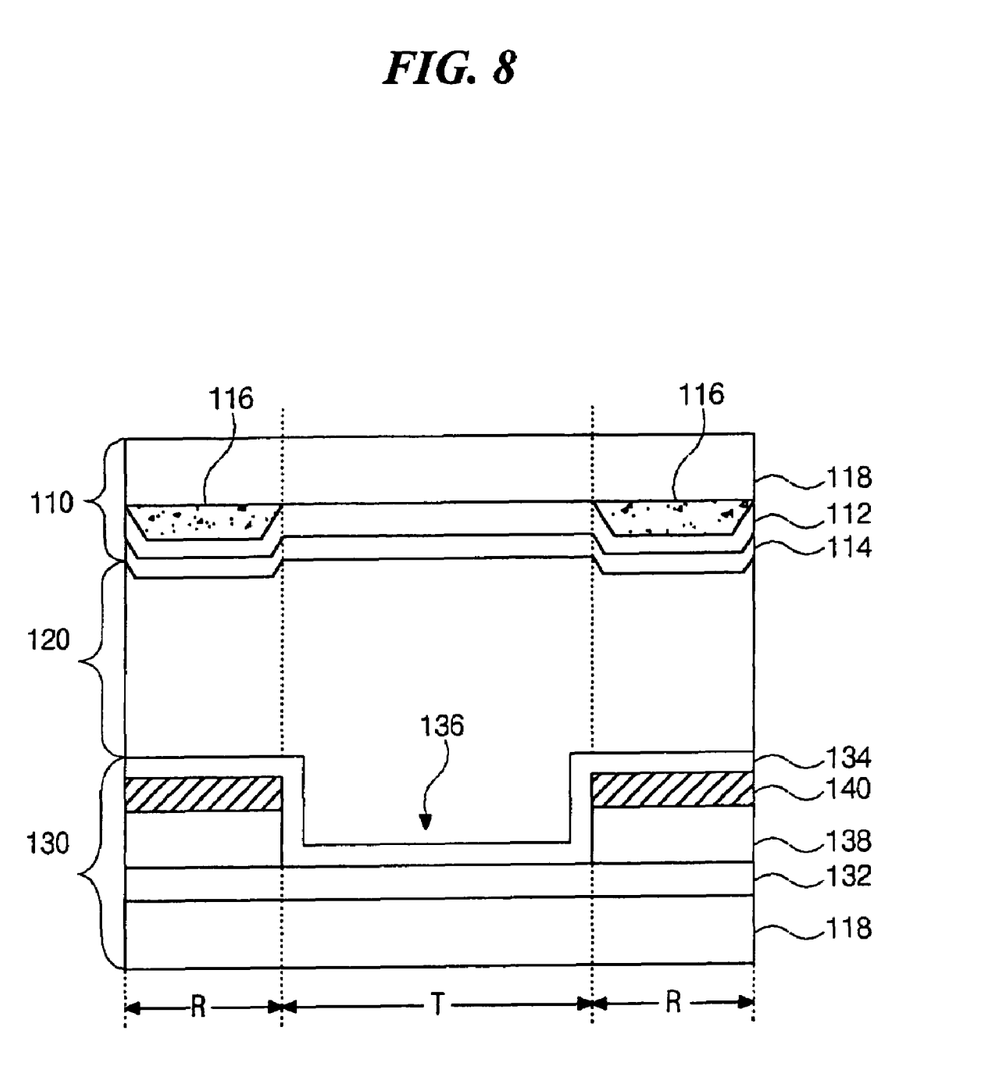
FIG. 8 is a cross sectional view of an exemplary transflective-type LCD device incorporating the color filter substrate of FIG. 5 according to the present invention.

FIG. 8 is a cross sectional view of an exemplary transflective-type LCD device incorporating the color filter substrate of FIG. 5 according to the present invention. In FIG. 8, a transflective LCD device may include an upper substrate 110, a lower substrate 130, a liquid crystal layer 120 interposed therebetween, and a backlight device (not shown) disposed below the lower substrate 130, wherein each of the upper and lower substrates 110 and 130 may include a transparent substrate 118. In addition, the transflective LCD may be divided into a reflective portion R and a transmissive portion T depending on whether a reflector 140 is used.

On the transparent substrate 118 of the lower substrate 130, an insulator 132 may be formed, and a passivation layer 138 and the reflector 140 may be formed in series on the insulator 132, especially in the reflective portion R. Since the passivation layer 138 may have an opening 136 corresponding to the transmissive portion T, the transflective LCD may have different cell gaps between the reflective portion R and the transmissive portion T. In addition, a transparent pixel electrode 134 may be formed over the transparent substrate 118 to cover the reflector 140, wherein the transparent pixel electrode 134 may also be formed on the insulator 132 within the opening 136 of the transmissive portion T. Since the reflector 140 may be disposed in the reflective portion R, light incident from an exterior may be re-reflected toward the exterior. In the transmissive portion T, light generated from the backlight device (not shown) may pass through the transparent pixel electrode 134.

In FIG. 8, a color filter layer 112 having different thicknesses may be formed on a rear surface of the transparent substrate 118 of the upper substrate 110. Then, a transparent common electrode 114 may be formed on a rear surface of the color filter layer 112, wherein the transparent common electrode 114 and the transparent pixel electrode 134 may supply an electric field to the liquid crystal layer 120. In the upper substrate 110, a buffer pattern 116 is disposed between the color filter 112 and the transparent substrate 118, especially within the reflective portion R that corresponds to the reflector 140 of the lower substrate 130. Accordingly, the buffer pattern 116 may include the saw-tooth shape, as shown in FIG. 5, and may be formed of a transparent material or by etching the transparent substrate 118. As described with reference to FIG. 5, the buffer pattern 116 may capture the viscous color photoresist (i.e., the color filter 112) so that it can control the thicknesses of the color filter 112 in the transmissive portion T and in the reflective portion R. Moreover, the thickness of the color filter 112 in the transmissive portion T may be at least about 1.3 times larger than that in the reflective portion R. The color filter thicknesses in the transmissive and reflective portions T and R may be controlled by a total number of the saw-teeth formed in the buffer pattern 116.

Figure 9:
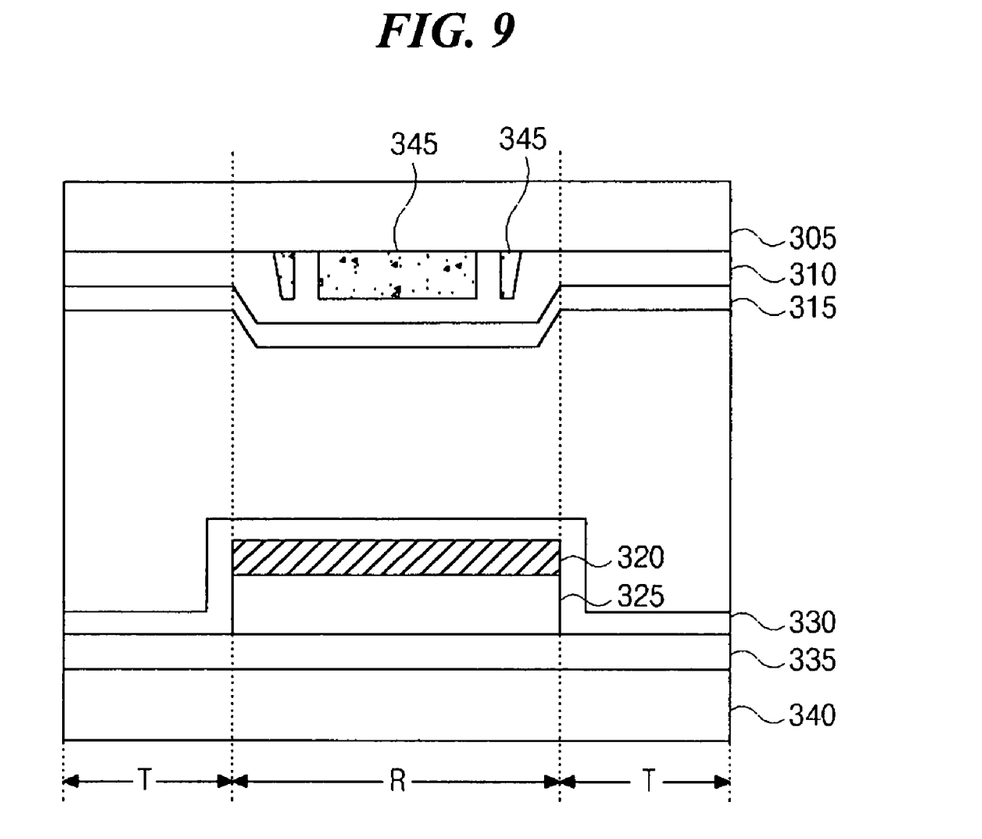
FIG. 9 is a cross sectional view of another exemplary transflective-type LCD device that incorporates the color filter substrate of one of FIGS. 6 and 7 according to the present invention.

FIG. 9 is a cross sectional view of another exemplary transflective-type LCD device that incorporates the color filter substrate of one of FIGS. 6 and 7 according to the present invention. In FIG. 9, a transflective LCD device may be divided into a reflective portion R and a transmissive portion T depending on whether a reflector 320 is used. Unlike the transflective LCD device of FIG. 8, the transflective LCD device of FIG. 9 may include the reflective portion R within a center portion of a pixel region. Alternatively, the transflective LCD device may have the transmissive portion T within the center portion of the pixel region and the reflective portion R may be disposed along a peripheral portion of the pixel region, similar to the transflective LCD device of FIG. 8.

In FIG. 9, an insulator layer 335 may be formed on a lower transparent substrate 340, and a passivation layer 325 and the reflector 320 may be formed in series on the insulator 335, especially in the reflective portion R. Since there is no passivation layer 325 in the transmissive portion T, different cell gaps may be obtained between the transmissive portion T and the reflective portion R. In addition, a transparent pixel electrode 330 may be formed over the lower transparent substrate 340 to cover the reflector 320 and the underlying passivation layer 325. The transparent pixel electrode 330 also may be disposed on both sides of the reflector 320 in the transmissive portion T. Accordingly, light incident from the exterior may be re-reflected toward the exterior in the reflective portion R, and light generated from the backlight device (not shown) may pass through the transparent pixel electrode 330 in the transmissive portion T.

In FIG. 9, a color filter layer 310 having different thicknesses may be formed on a rear surface of an upper transparent substrate 305. Then, a transparent common electrode 315 may be formed on a rear surface of the color filter layer 310. Accordingly, the transparent common electrode 315 and the transparent pixel electrode 330 may supply an electric field to the liquid crystal layer. Furthermore, a buffer pattern 345 may be disposed between the color filter 310 and the upper transparent substrate 310, especially within the reflective portion R corresponding to the reflector 320. Thus, exemplary transflective-type LCD device of FIG. 9 may include the buffer pattern 345 having a plurality of holes therein, as shown in FIGS. 6 and 7. In addition, the buffer pattern 345 may have a saw-tooth shape, as shown in FIG. 6, or may have a stripe shape, as shown in FIG. 7. The buffer pattern 345 may be formed of a transparent material, or may be formed by etching the upper transparent substrate 305. As described with reference to FIGS. 6 and 7, the buffer pattern 345 may capture the viscous color photoresist (i.e., the color filter 310) to control the thicknesses of the color filter 310 both in the transmissive portion T and in the reflective portion R. Moreover, the thickness of the color filter 310 in the transmissive portion T may be at least about 2 times larger than that in the reflective portion R. The color filter thicknesses in the transmissive and reflective portions T and R may be controlled by the number of holes and sizes of the holes. Furthermore, if the buffer pattern 345 has the saw-tooth shape, as shown in FIG. 6, the color filter thickness may also be controlled by the number of saw-teeth formed in the buffer pattern 345.

According to the present invention, the buffer pattern disposed in the color filter substrate may have a saw-tooth shape and/or a plurality of holes. Thus, the buffer pattern may control flowing of the viscous color resin, and the saw-tooth shape and/or the plurality of holes may capture the viscous color resin when forming the color filter. Eventually, the color filter in the transmissive portion may have a color purity and a chromaticity almost double as much as the color filter in the reflective portion.

It will be apparent to those skilled in the art that various modifications and variation can be made in the transflective lcd device having dual thickness color filter of the present invention without departing from the spirit or scope of the invention. Thus, it is intended that the present invention cover the modifications and variations of this invention provided they come within the scope of the appended claims and their equivalents.

What is claimed is:

1. A transflective LCD device, comprising:
   first and second transparent substrates spaced apart from each other and having a reflective portion and a transmissive portion, wherein the first and second transparent substrates include a plurality of pixel regions, and the reflective portion and the transmissive portion are disposed in each pixel region;
   an insulator on the first transparent substrate;
   a passivation layer on the insulator within the reflective portion;
   a reflector on the passivation layer;
   a transparent pixel electrode disposed over the reflector and covering the reflector and the passivation layer;
   a buffer pattern disposed on a rear surface of the second substrate, the buffer pattern having a striped shape and a plurality of holes therein corresponding to the reflective portion;
   a color filter on the rear surface of the second substrate covering the buffer pattern, the color filter having a first thickness in the transmissive portion and a second thickness in the reflective portion;
   a transparent common electrode over the second substrate such that the color filter layer and the buffer pattern are positioned between the second substrate and the transparent common electrode; and
   a liquid crystal layer between the transparent pixel electrode and the transparent common electrode,
   wherein the striped shape in adjacent pixel regions arranged in a row are disposed on a virtual straight line, and wherein a maximum width of the buffer pattern is less than about 50 micrometers.

2. The device according to claim 1, wherein the plurality of holes capture a viscous color resin when forming the color filter thereon.

3. The device according to claim 1, wherein a maximum width of the buffer pattern is about 14 micrometers.

4. The device according to claim 1, wherein the first thickness of the color filter in the transmissive portion is at least about 1.3 times larger than the second thickness of the color filter in the reflective portion.

5. The device according to claim 1, wherein the first thickness of the color filter in the transmissive portion is about twice as large as the second thickness of the color filter in the reflective portion.

6. The device according to claim 1, wherein the transmissive portion is disposed within a center portion of a pixel region, the passivation layer has an opening that corresponds to the transmissive portion, and the transparent pixel electrode contacts the insulator in the transmissive portion through the opening.

7. The device according to claim 1, wherein the reflective portion is disposed within a center portion of a pixel region, and the transparent pixel electrode contacts the insulator on both sides of the reflector.

8. A color filter substrate for use in a transflective LCD device, comprising:
   a substrate having a reflective portion and a transmissive portion, wherein the substrate includes a plurality of pixel regions, and the reflective portion and the transmissive portion are disposed in each pixel region;
   a buffer pattern disposed on a rear surface of the substrate, the buffer pattern having a striped shape and a plurality of holes therein corresponding to the reflective portion;
   a color filter on the rear surface of the substrate covering the buffer pattern, the color filter having a first thickness in the transmissive portion and a second thickness in the reflective portion;
   a transparent common electrode over the substrate such that the color filter layer and the buffer pattern are positioned between the substrate and the transparent common electrode;
   wherein the plurality of holes capture a viscous color resin when forming the color filter thereon; and
   wherein the first thickness of the color filter in the transmissive portion is at least about 1.3 times larger than the second thickness of the color filter in the reflective portion,
   wherein the striped shape in adjacent pixel regions arranged in a row are disposed on a virtual straight line, and wherein a maximum width of the buffer pattern is less than about 50 micrometers.

* * * * *